United States Patent Office 3,787,499
Patented Jan. 22, 1974

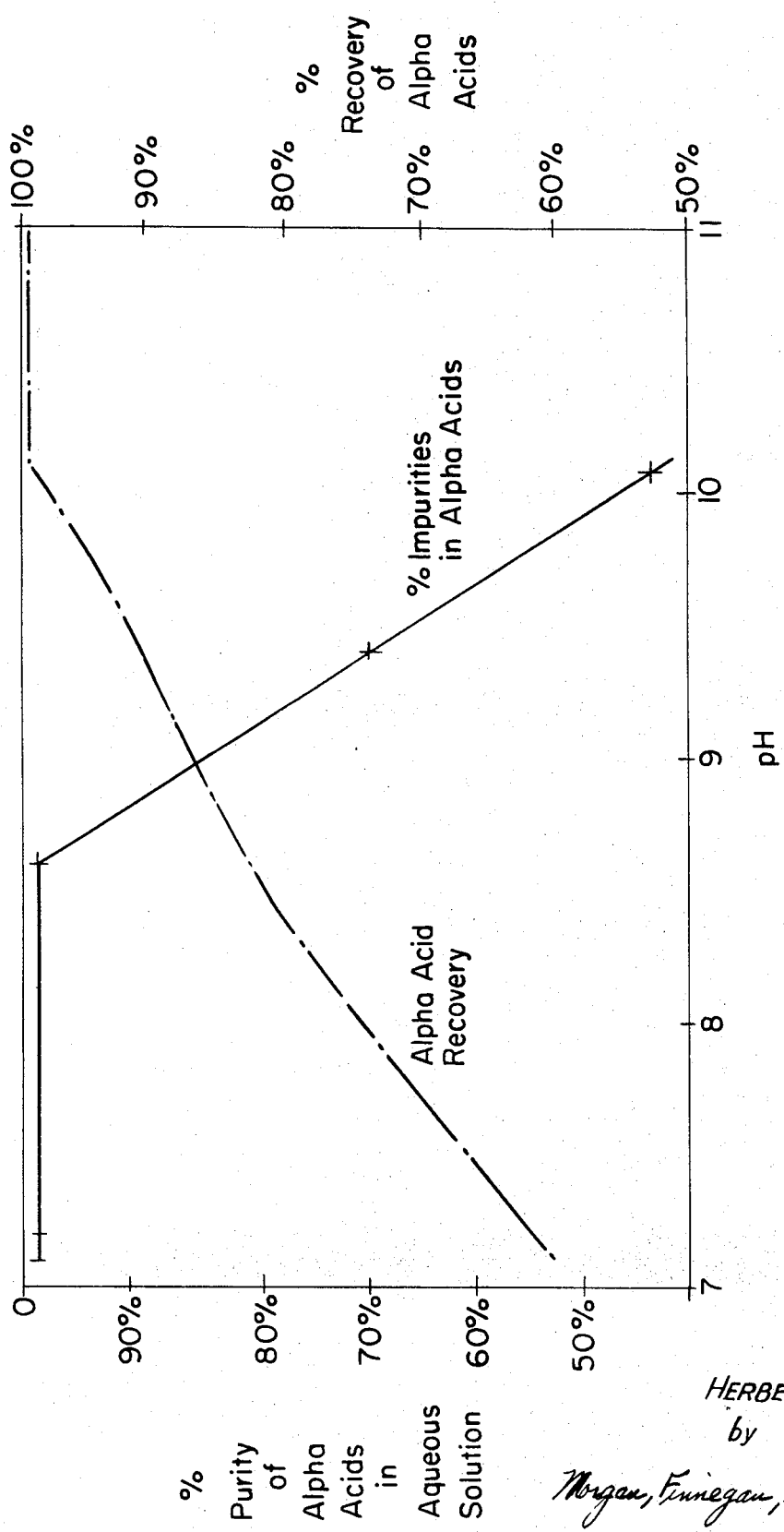

3,787,499
EXTRACTION OF PURE BITTER ACIDS FROM HOPS OR CRUDE HOP EXTRACTS
Herbert L. Grant, Yakima, Wash., assignor to Hops Extract Corporation of America, Yakima, Wash.
Filed Sept. 3, 1971, Ser. No. 177,652
Int. Cl. C07c 45/24
U.S. Cl. 260—586 R          11 Claims

ABSTRACT OF THE DISCLOSURE

A novel process for the extraction of pure alpha acids from hops is described.

---

This invention relates to a novel process for the extraction of alpha acids from hops.

Hops are used in the preparation of beer, ale and other malt beverages to impart certain properties to the flavor of the finished product. Sometimes whole or ground hops are added to the brew wort and the residues are removed after the mixture is boiled for the desired length of time. This procedure has been objected to as cumbersome, wasteful and time consuming. The hops are a natural product and may vary in quality. They are also subject to degradation and may produce different flavors in successive batches of beer.

In the prior art, it has been proposed to prepare various extracts of hops to supply the various flavor principles in a concentrated form which is stable and easily handled. For example, U.S. Pat. 3,364,265 describes a process for the preparation of a hop extract. This extract is prepared by treating a hexane extract of hops with dilute aqueous sodium hydroxide and thereafter separating the aqueous layer and recovering the alpha acids therefrom.

This process is based on the partition of the extract products between two immiscible solvents and due to the partition coefficient may result in a loss of alpha acid values. Also, special equipment is required for separation of the immiscible solvents containing the extracts.

The present invention is concerned with preparing a hop extract by the use of a polar solvent having a solubility in water of at least 1% by weight. This includes all water miscible polar solvents such as the lower alkanols which include methanol, ethanol, 1-propanol, 2-propanol, and 1-butanol. Methylene chloride and trichloroethylene are also useful solvents for the practice of the invention. The extract prepared by the use of the polar solvent will contain the alpha acids, beta acids and various resins. Generally, the amount of polar solvent employed in the extract is not critical and may vary depending upon the particular polar solvent and the extraction technique which is employed. Thereafter, the solvent is concentrated by evaporation or by other techniques well known to those skilled in the art. The polar extract solvent should be concentrated so that about 5 to about 30 percent by weight of solvent is present in the extraction solution. It is especially preferred to employ polar extract solutions having about 10 to about 20 percent by weight of polar solvent.

The polar extract solution is then added to an aqueous solution of an alkali metal hydroxide. A sufficient amount of the polar extract solution which will result in the precipitation of the hop resins and the beta acids is employed. A ratio of from 1:5 to 1:100 volumes of polar solvent extract to aqueous alkali metal hydroxide solution may be employed. It is especially preferred to employ a ratio of about 1:10 of polar solvent extract solution to aqueous alkali.

It is necessary to add the polar extract solution to the aqueous alkali as the reverse order of addition will result in the formation of a resinous interface which substantially decreases the yield of the alpha acids.

The preferred aqueous alkali solution is prepared from an alkali metal hydroxide at a concentration of from about 0.2 to about 0.5 percent w./v. The preferred concentration of the alkali metal hydroxide is 0.35 percent w./v. The term "alkali metal hydroxide" is used to include sodium, potassium, and lithium hydroxide. The range of the alkali metal hydroxide has been found to be critical, as a substantially higher concentration results in the production of a resinous interface and a decreased yield of the alpha acids. The aqueous solutions of the alkali metal hydroxide and the polar extract solution of the hops are than vigorously agitated to precipitate the resinous beta acids. As the agitation is continued, a drop in the pH is noted. It has been found that the pH is related to the degree of solution of the alpha acids and can be employed to control the quantity of beta acid present in the solution. Additional quantities of polar solvent extract may be added to the alkali metal hydroxide solution to decrease the pH and cause substantially all of the hop resins and beta acids to precipitate.

It is desirable to add a sufficient quantity of the polar extract solution to cause the pH to stabilize at about 7.5 to about 9. At this pH range, it has been found that the alpha acids are recovered substantially completely free of the beta acids.

This is illustrated further by reference to the drawing. The drawing is a graph which illustrates the pH relationship to the percent of alpha acid recovery. The pH may be regulated so as to obtain essentially pure alpha acids which are substantially free of beta acids. After recovery of the alpha acids in the aqueous solution they may be isomerized to the iso-alpha acids which are also known as isohumulones. The isomerization procedure may be any suitable technique, e.g. heat. The residual fraction that is obtained as a precipitate when the aqueous alkali metal hydroxide is added to the polar solvent extract solution, is also useful in the brewing process as a kettle additive to impart a non-bitter hop flavor to the particular malt beverage.

The principles of the invention are applicable to any form of hops and the term is used to include any form of hops normally employed in the brewing art. Examples of such forms are dried hops (ground or whole), fresh hops (green hops), frozen hops and lupulin (dried or fresh), etc.

The invention in its broader aspects is not limited to the specific steps, methods and compositions described, but departures may be made therefrom within the scope of the accompanying claims without departing from the principles of the invention without sacrificing its chief advantages.

The following examples illustrate the best mode contemplated by the inventor of carrying out the invention:

EXAMPLE I 1000 grams of hops containing 72 grams of alpha acids were extracted three times with methylene chloride. Total volume of extract solution was 980 ml. This was evaporated to a thin syrup with a volume of 210 ml., which contained 70 grams of alpha acids, 110 grams beta resins, etc. and 25 grams of methylene chloride. This solution was added to a vigorously agitated aqueous solution of alkali (4.77 liters of 0.31% KOH). The initial pH was recorded as 9.2, but after stirring for 45 minutes the pH stabilized at 8.4. The suspension was centrifuged to remove suspended soft resins, then 50 grams of diatomaceous earth was added and the whole solution filtered. Analysis of the filtrate indicated 1.41% alpha acid in 4.4 liters of solution or 6.2 grams of alpha acid (88.6% recovery). Spectrophotometric analysis and inspection of thin layer chromatographic plates revealed no evidence of beta acids or other major contaminants.

The residual resins plus the diatomaceous earth filter cake were dried to produce a coarse powder containing soft resins, hard resins and oils. This fraction is employed as a kettle additive to impart non-bitter hop flavor to the beverage.

EXAMPLE II 17 grams of hop extract (40.8% alpha acids) which was produced by extraction of hops with methylene chloride, was added to 5 grams of methylene chloride and subsequently was vigorously admixed with 450 ml. of 0.30% aqueous potassium hydroxide. The initial pH was 9.1 and after 45 minutes it had stabilized at 8.2. The suspension was filtered, using 5 grams of diatomaceous earth as a filter acid, to yield 500 ml. of a solution containing 1.143% alpha acids. This was equivalent to an overall yield of 82.4%. No trace of beta acids was found by spectrophotometric or thin layer chromatographic analysis.

EXAMPLE III 12.5 grams of hop extract (40.8% alpha acid) (produced by methylene chloride extraction of hops) was mixed with 4 grams of methylene chloride, then 450 ml. of 0.30% aqueous potassium hydroxide was added with vigorous stirring. The initial pH was 9.9 and after 45 minutes the pH stabilized at 9.4. 10 grams of diatomaceous earth was added and the suspension filtered to yield 420 ml. of solution containing 1.15% alpha and 0.35% beta acids. The dried filter cake yielded 16.8 grams of powder containing 0.1% alpha and 10.2% beta acids. The amount of alpha acid in the aqueous solution corresponded to 94.7% based on total resin.

EXAMPLE IV 18.0 grams of hop extract prepared as in Examples II and III was admixed with 5 ml. of methanol then added slowly, to 450 ml. of aqueous 0.30% potassium hydroxide. The initial pH was 9.4 and this stabilized to 8.6 after one hour of stirring. The suspension was centrifuged to yield 420 ml. of solution which assayed as containing 1.38% alpha acid and 0.0% beta acids (spectrophotometric analysis as per A.S.B.C.) plus 10.4 grams of residue (after drying) assaying 43.2% beta and 7.5% alpha acids. Yield of alpha acids from the resins to the aqueous solution was 78.9%.

What is claimed is:

1. A method for obtaining from hops, the water soluble alpha acids, substantially free of beta acids, which comprises preparing a hop extract by contacting the hops with a solvent selected from the group consisting of methylene chloride, methanol, ethanol, 1-propanol, 2-propanol, 1-butanol and 1-hexanol; adding a sufficient amount of the polar solvent extract to an aqueous solution of about 0.2 to about 0.5 percent of an alkali metal hydroxide to precipitate the hop resins and beta acids; separating the hop resins and beta acids; and recovering the alpha acids substantially free of beta acids.

2. The method according to claim 1 wherein the alkali metal hydroxide is potassium hydroxide.

3. The method according to claim 1, wherein the solvent is methylene chloride.

4. The method according to claim 1, wherein the solvent is selected from the group consisting of methanol, ethanol, 1-propanol, 2-propanol, 1-butanol and 1-hexanol.

5. The method of claim 4 wherein the solvent is methanol.

6. The method according to claim 1, wherein the hop resins and beta acids are separated from the mixed solution by centrifugation.

7. The method according to claim 1, wherein the hop resins and beta acids are separated from the mixed solution by filtration with diatomaceous earth.

8. The method according to claim 1, wherein the solvent is methylene chloride and the alkali metal hydroxide is potassium hydroxide.

9. The method according to claim 1, wherein the alkali metal hydroxide is present in a concentration of about 0.35 percent by weight.

10. The method of claim 1 wherein the aqueous alkali solution is employed at a ratio of 1:10 parts by volume of solvent extract to aqueous alkali solution.

11. A method for obtaining the water soluble alpha acids, substantially free of beta acids, from hops which comprises preparing a hop extract by contacting the hops with polar solvent selected from the group consisting of methylene chloride or a lower alkanol; adding a sufficient amount of the obtained hop extract to an aqueous solution of about 0.2 to about 0.5 percent of an alkali metal hydroxide so that the aqueous alkali metal hydroxide is employed at a ratio of 1:5 to 1:100 parts by volume of polar solvent extract to aqueous alkali metal hydroxide solution in order to precipitate the hop resins and beta acids; separating the hop resins and beta acids and recovering the alpha acids substantially free of beta acids.

References Cited

UNITED STATES PATENTS 3,364,265  1/1968  Klingel et al. _____ 260—586 R
3,354,219  11/1967  Rigby _____ 260—586 R BERNARD HELFIN, Primary Examiner N. MORGENSTERN, Assistant Examiner U.S. Cl. X.R.

99—48